(12) United States Patent
Kimura

(10) Patent No.: US 9,830,268 B2
(45) Date of Patent: Nov. 28, 2017

(54) ARITHMETIC PROCESSING DEVICE FOR DISABLING AN UNNECESSARY PREFETCH COMMAND AND CONTROL METHOD OF ARITHMETIC PROCESSING DEVICE FOR DISABLING AN UNNECESSARY PREFETCH COMMAND

(71) Applicant: FUJITSU LIMITED, Kawasaki-shi, Kanagawa (JP)

(72) Inventor: Shigeru Kimura, Hachiouji (JP)

(73) Assignee: FUJITSU LIMITED, Kawasaki (JP)

( * ) Notice: Subject to any disclaimer, the term of this patent is extended or adjusted under 35 U.S.C. 154(b) by 70 days.

(21) Appl. No.: 14/695,341

(22) Filed: Apr. 24, 2015

(65) Prior Publication Data

US 2015/0331800 A1 Nov. 19, 2015

(30) Foreign Application Priority Data

May 14, 2014 (JP) ................................. 2014-100210

(51) Int. Cl.
*G06F 12/00* (2006.01)
*G06F 12/0862* (2016.01)

(52) U.S. Cl.
CPC .. *G06F 12/0862* (2013.01); *G06F 2212/1008* (2013.01); *G06F 2212/1024* (2013.01); *G06F 2212/602* (2013.01); *G06F 2212/6022* (2013.01); *G06F 2212/6026* (2013.01)

(58) Field of Classification Search
None
See application file for complete search history.

(56) References Cited

U.S. PATENT DOCUMENTS

| 5,950,007 | A | * | 9/1999 | Nishiyama | ............ | G06F 8/4442 |
| | | | | | | 717/146 |
| 6,134,633 | A | * | 10/2000 | Jacobs | ................ | G06F 12/0862 |
| | | | | | | 711/137 |
| 6,895,496 | B1 | * | 5/2005 | Taniguchi | ............. | G06F 9/3804 |
| | | | | | | 712/207 |

(Continued)

FOREIGN PATENT DOCUMENTS

| JP | 2001-166989 | 6/2001 |
| JP | 2002-297379 | 10/2002 |

(Continued)

*Primary Examiner* — Reginald Bragdon
*Assistant Examiner* — Michael Westbrook
(74) *Attorney, Agent, or Firm* — Staas & Halsey LLP

(57) ABSTRACT

An arithmetic processing device includes a decoder which decodes commands, a command holding unit configured to register therein the commands involving memory accesses among the decoded commands, a hardware prefetch controller configured to execute a prefetch in response to a trigger independent of a prefetch command to execute the prefetch, the prefetch being an operation of transferring data stored in a memory to a cache memory in advance, and a controller configured to determine whether an unnecessary prefetch command to transfer the data, which is to be transferred to the cache memory by the hardware prefetch controller, from the memory to the cache memory is registered in the command holding unit, and disables the unnecessary prefetch command when the unnecessary prefetch command is registered in the command holding unit.

6 Claims, 4 Drawing Sheets

(56) References Cited

U.S. PATENT DOCUMENTS

| | | | |
|---|---|---|---|
| 2002/0144062 A1 | 10/2002 | Nakamura | |
| 2003/0204673 A1* | 10/2003 | Venkumahanti | G06F 9/383 711/137 |
| 2004/0049640 A1* | 3/2004 | So | G06F 12/0862 711/137 |
| 2004/0054853 A1* | 3/2004 | Sprangle | G06F 12/0897 711/137 |
| 2004/0073758 A1* | 4/2004 | Blumrich | G06F 9/52 711/151 |
| 2008/0059715 A1* | 3/2008 | Tomita | G06F 12/0862 711/130 |
| 2009/0132733 A1 | 5/2009 | Codrescu et al. | |
| 2009/0240887 A1 | 9/2009 | Okawara et al. | |
| 2009/0287884 A1* | 11/2009 | Toyoshima | G06F 8/4442 711/137 |
| 2013/0179663 A1* | 7/2013 | Heisch | G06F 9/3802 712/207 |
| 2014/0115263 A1* | 4/2014 | Ruehle | G06F 17/272 711/137 |
| 2015/0058600 A1* | 2/2015 | Ishizaki | G06F 9/3804 712/207 |
| 2015/0106590 A1* | 4/2015 | Chou | G06F 9/30072 712/207 |

FOREIGN PATENT DOCUMENTS

| | | |
|---|---|---|
| JP | 2006-330813 | 2/2006 |
| JP | 2009-230374 | 10/2009 |
| JP | 2010-244204 | 10/2010 |
| JP | 2011-504274 | 2/2011 |
| JP | 2011-81836 | 4/2011 |
| WO | 2009/067525 A1 | 5/2009 |

\* cited by examiner

ARITHMETIC PROCESSING DEVICE FOR DISABLING AN UNNECESSARY PREFETCH COMMAND AND CONTROL METHOD OF ARITHMETIC PROCESSING DEVICE FOR DISABLING AN UNNECESSARY PREFETCH COMMAND

CROSS-REFERENCE TO RELATED APPLICATION

This application is based upon and claims the benefit of priority of the prior Japanese Patent Application No. 2014-100210, filed on May 14, 2014, the entire contents of which are incorporated herein by reference.

FIELD

The embodiments discussed herein are related to an arithmetic processing device, and a control method of the arithmetic processing device.

BACKGROUND

An arithmetic processing device includes, for example, a decoder which decodes commands, an arithmetic unit which executes computations based on the decoded commands, and a cache memory which is disposed between the arithmetic unit and a main memory serving as a main storage device. The arithmetic unit executes computations by referring to, for example, data stored in the main memory or the cache memory. The cache memory stores therein, for example, data which is referred to by the arithmetic units.

The arithmetic processing device may shorten a waiting time for referring to data, for example, by referring to data stored in the cache memory, compared with by referring to data stored in the main memory. However, a numerical value calculation processing which uses large-scale data such as an array has a low hit ratio in the cache memory because of the low locality of the data. In this case, the cache memory is not effectively used accordingly to obtain only a small effect of shortening a waiting time for referring data.

One of solutions to the low hit ratio in the cache memory uses, for example, a prefetch in which data stored in the main memory is transferred in advance to the cache memory. A software prefetch by software and a hardware prefetch by a hardware have been known as methods of implementing prefetch.

For example, in the software prefetch, a compiler inserts, in a machine language program, a command (hereinafter, referred to as a prefetch command) to transfer in advance data stored in the main memory to the cache memory. Further, the compiler executes compile processing of converting, for example, a source program into a machine language program executable by an arithmetic processing device such as a processor.

On the other hand, in the hardware prefetch, hardware such as a hardware prefetch mechanism is provided in the arithmetic processing device. For example, if determining that sequential memory accesses will be executed, the hardware prefetch mechanism predicts data to be accessed next, and transfers in advance the data stored in the main memory to the cache memory.

However, even if applying software prefetches, an arithmetic processing device including a hardware prefetch mechanism, for example, may achieve only lowed performance in some cases. For example, both of a prefetch by a hardware prefetch mechanism and a prefetch by a prefetch command are executed on data at the same address in some cases. In other words, an unnecessary prefetch command is executed in some cases. In this case, the execution of the unnecessary prefetch command may cause decrease in performance such as a lowered transfer speed due to increase in the number of commands and increase in the transfer amount in a bus.

Accordingly, there has been proposed a technique of running both a hardware prefetch and a software prefetch together with high efficiency to enhance the performance of the arithmetic processing device. The arithmetic processing device of this type uses, for example, a memory access command added with an indication informing whether or not the command is targeted for a hardware prefetch. For example, at compile processing, if detecting memory access commands involving successive memory accesses, the compiler creates a memory access command added with the indication. For example, the complier is stopped from creating a prefetch command for a memory access command added with an indication informing that the command is targeted for a hardware prefetch.

The following are related prior art documents: Japanese Laid-open Patent Publication Nos. 2009-230374, 2010-244204, 2006-330813, 2011-81836, 2002-297379, 2001-166989 and Japanese National Publication of International Patent Application No. 2011-504274

In the case where software prefetch is applied to an arithmetic processing device including a hardware prefetch mechanism, there is a possibility that the performance of the arithmetic processing device may be lowered due to execution of unnecessary prefetch commands. Further, even by use of the method of stopping creation of a prefetch command at compile processing, unnecessary prefetch commands may be executed. For example, in some cases, at an actual operation, the arithmetic processing device may perform a hardware prefetch for a memory access command which has been determined not to be targeted for the hardware prefetch at the compile processing. In this case, the prefetch command may be executed unnecessarily.

SUMMARY

According to an aspect of the invention, an arithmetic processing device includes a decoder which decodes commands, a command holding unit configured to register therein the commands involving memory accesses among the decoded commands, a hardware prefetch controller configured to execute a prefetch in response to a trigger independent of a prefetch command to execute the prefetch, the prefetch being an operation of transferring data stored in a memory to a cache memory in advance, and a controller configured to determine whether an unnecessary prefetch command to transfer the data, which is to be transferred to the cache memory by the hardware prefetch controller, from the memory to the cache memory is registered in the command holding unit, and disables the unnecessary prefetch command when the unnecessary prefetch command is registered in the command holding unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

According to an aspect of an embodiment disclosed herein, an arithmetic processing device and a control method of the arithmetic processing device may reduce memory accesses in response to unnecessary prefetch commands. Hereinafter, the embodiment will be described with reference to the drawings.

Figure 1:
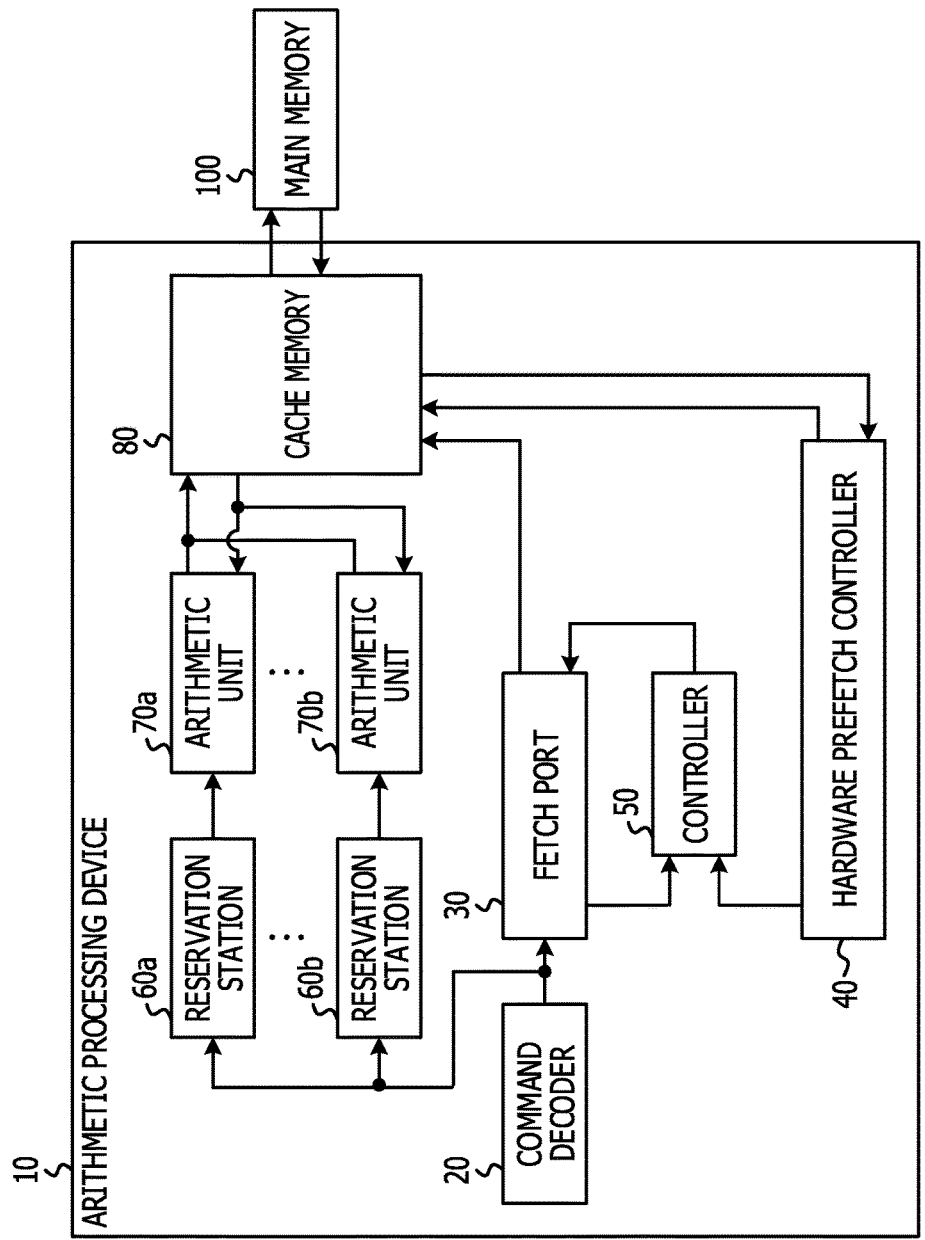
FIG. 1 illustrates one embodiment of an arithmetic processing device and a control method of the arithmetic processing device.

FIG. 1 illustrates the one embodiment of an arithmetic processing device and a control method of the arithmetic processing device. An arithmetic processing device 10 in the embodiment is, for example, a processor such as a central processing unit (CPU) capable of executing a prefetch in which data stored in a main memory 100 serving as a main storage device is transferred in advance to a cache memory 80. The main memory 100 stores therein, for example, data used for computations by the arithmetic processing device 10 and computation results thereof.

A software prefetch by software and a hardware prefetch by a hardware are used as an implement method of the prefetch. For example, in the software prefetch, a prefetch command to transfer in advance data stored in the main memory 100 to the cache memory 80 is created at compile processing of converting a source program into a machine language program executable by the arithmetic processing device 10. Further, the prefetch command may preferably be implemented by a command to load data, or may preferably be implemented by a prefetch dedicated command. On the other hand, the hardware prefetch is executed, for example, by a hardware prefetch controller 40.

The arithmetic processing device 10 includes, for example, a command decoder 20, a fetch port 30, the hardware prefetch controller 40, a controller 50, reservation stations 60 (60a, 60b), arithmetic units 70 (70a, 70b), and the cache memory 80.

The command decoder 20 is an example of a decoder which decodes a command. For example, the command decoder 20 reads out a command from a command cache or the like in which commands are stored, and decodes the read-out command. Further, the command decoder 20 outputs the decoded command to the fetch port 30 and any of the reservation stations 60.

The fetch port 30 is an example of a command holding unit in which a command involving a memory access is registered. For example, the command involving a memory access, among the commands decoded by the command decoder 20, is registered in the fetch port 30 as an execution waiting command. The command involving a memory access is, for example, a store command to store data, a load command to load data, a prefetch command, or the like.

For example, the fetch port 30 is a buffer in which a command involving a memory access is stored. The fetch port 30 is used, for example, as a buffer in which multiple commands to load and store mutually-independent data are stored in pipe line processing with the execution order of the commands changed. For example, the fetch port 30 may hold an arbitrary number of load commands or store commands. In other words, the fetch port 30 is used as a reservation station for commands relating to a memory access such as a store command, a load command, and a prefetch command.

The hardware prefetch controller 40 is an example of a hardware prefetch controller which executes a prefetch. For example, the hardware prefetch controller 40 executes a prefetch in response to a predetermined trigger independent of the prefetch command. For example, at successive region accesses, the hardware prefetch controller 40 executes a hardware prefetch in response to detection of cache misses in the successive cache lines. Here, in a case where a cash line in the cache memory 80 is set as a unit of one access, for example, a successive region access means an access whose access destination is shifted from the previous access destination by less than two lines (a range having successive cache lines).

Alternatively, in a case where the access destination having a certain access width is shifted to the next one in a direction of any of ascending order and descending order, the hardware prefetch controller 40 may preferably execute a hardware prefetch when detecting successive cache misses. In this manner, in accesses where the access destination is regularly shifted, the hardware prefetch controller 40 executes a hardware prefetch in response to successive cache misses. Further, the predetermined trigger (operation condition) by which the hardware prefetch is executed is not limited to these examples.

The controller 50 is an example of a controller which disables an unnecessary prefetch command. For example, the controller 50 determines whether an unnecessary prefetch command is registered in the fetch port 30. Further, if an unnecessary prefetch command is registered in the fetch port 30, the controller 50 disables the unnecessary prefetch command. Note that, the unnecessary prefetch command is, for example, a prefetch command to transfer data to be included in data transferred by the hardware prefetch controller 40 to the cache memory 80, from the main memory 100 to the cache memory 80.

In this manner, the controller 50 disables the unnecessary prefetch command. This allows the arithmetic processing device 10 to reduce memory accesses (accesses to the main memory 100 or the like) in response to unnecessary prefetch commands. Further, the controller 50 disables an unnecessary prefetch command, for example, by deleting the unnecessary prefetch command from the fetch port 30. Alternatively, the controller 50 may preferably disable an unnecessary prefetch command by replacing the unnecessary prefetch command with a NOP (No Operation) command.

The reservation station 60 (60a, 60b) is, for example, a reservation station for an computation command. The reservation station 60a registers therein, out of the commands decoded by the command decoder 20, a command to be executed in the arithmetic unit 70a. For example, the reservation station 60a selects, regardless of the order of programs, a command in an executable state. Further, the reservation station 60a outputs the selected command to the arithmetic unit 70a.

The reservation station 60b registers therein, out of the commands decoded by the command decoder 20, a command to be executed in the arithmetic unit 70b. For example, the reservation station 60b selects, regardless of the order of programs, a command in an executable state. Further, the reservation station 60b outputs the selected command to the arithmetic unit 70b.

The arithmetic unit 70 (70a, 70b) executes a computation based on the decoded command. For example, the arithmetic unit 70a executes a computation based on the command received from the reservation station 60a, by referring to the data stored in the cache memory 80. Moreover, for example, the arithmetic unit 70b executes a computation based on the command received from the reservation station 60b, by referring to the data stored in the cache memory 80. Further, the arithmetic unit 70 stores, for example, the computation result in the cache memory 80.

The cache memory 80 stores therein data received from the main memory 100. For example, the cache memory 80 stores therein data referred by the arithmetic unit 70. In addition, the cache memory 80 stores therein data transferred from the main memory 100 by a hardware prefetch or a software prefetch. Moreover, the cache memory 80 outputs data such as an operation result to the main memory 100.

Figure 2:
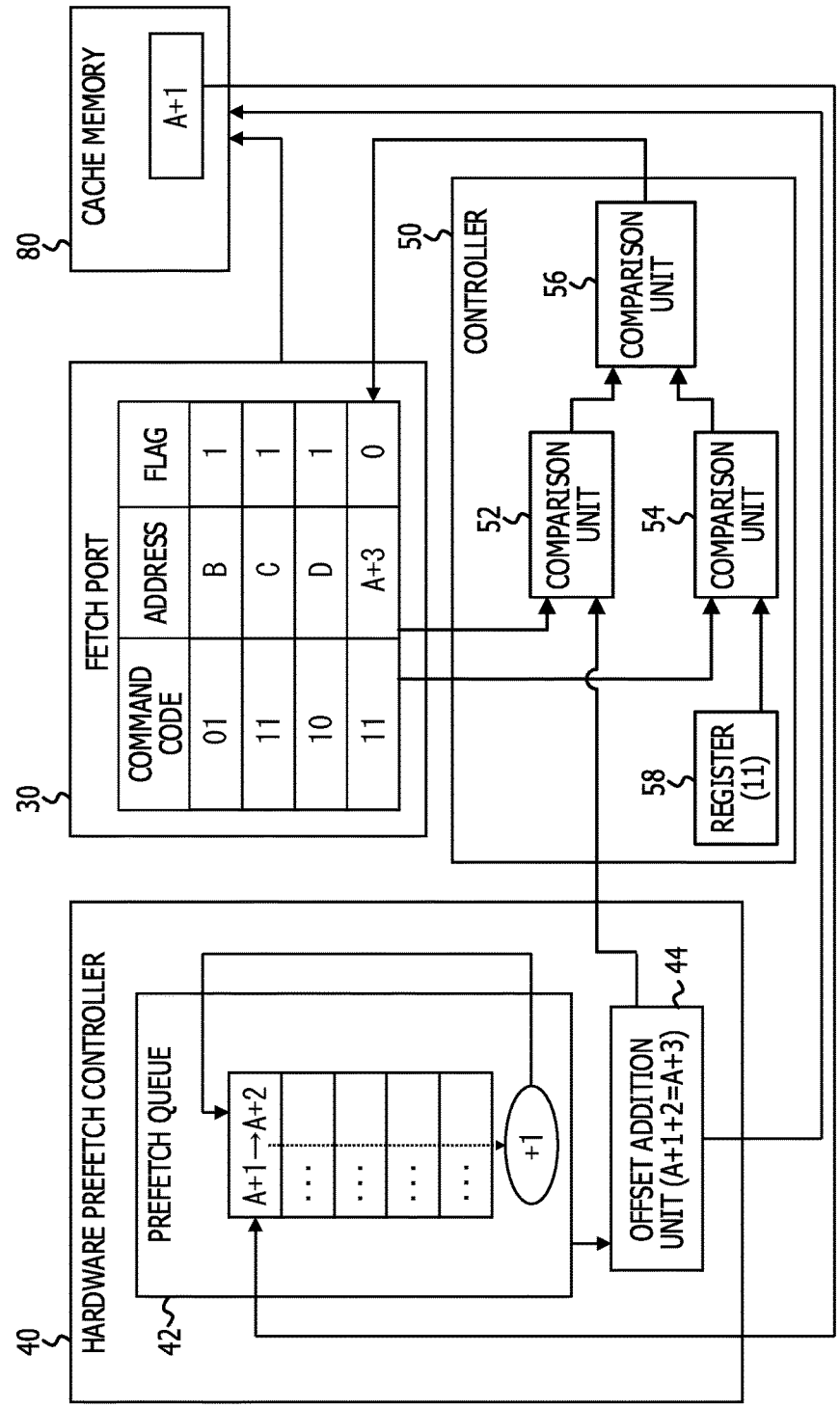
FIG. 2 illustrates an example of a fetch port, a hardware prefetch controller, and a controller illustrated in FIG. 1.

FIG. 2 illustrates an example of the fetch port 30, the hardware prefetch controller 40, and the controller 50 which are illustrated in FIG. 1. Further, FIG. 2 mainly explains an operation when a cache line "A+1" in the cache memory 80 is accessed. The cache line "A+1" is a cache line having a cache line number of "A+1". Moreover, in the example of FIG. 2, at successive region accesses, the hardware prefetch controller 40 executes a hardware prefetch in response to detection of cache misses in the successive cache lines. Hereinafter, the successive region accesses are also referred to as a stream access. Moreover, target data of a prefetch is also referred to as prefetch data.

The hardware prefetch controller 40 includes a prefetch queue 42 and an offset addition unit 44. The prefetch queue 42 is an example of an address holding unit which stores therein first address information to which the hardware prefetch controller 40 refers in order to detect a predetermined trigger (trigger for executing a hardware prefetch). For example, the prefetch queue 42 holds therein multiple entries by First-In First-Out (FIFO). For example, when a cache miss occurs in a cache line "A", the hardware prefetch controller 40 newly registers line information indicating a cache line "A+1" and line information indicating a cache line "A−1" in the prefetch queue 42.

Further, when the cache line "A+1" is accessed by the subsequent access, and a cache miss occurs in the cache line "A+1", the line information "A+1" registered in the prefetch queue 42 is hit. In response to this, the hardware prefetch controller 40 determines to perform an ascending order stream access, and thereafter, starts hardware prefetches in an ascending order direction. Moreover, the hardware prefetch controller 40 updates the entry in the prefetch queue 42 from the line information indicating the cache line "A+1" to line information indicating a cache line "A+2".

Further, when the cache line "A−1" is accessed by the subsequent access of the access to the cache line "A", and a cache miss occurs in the cache line "A−1", the line information "A−1" registered in the prefetch queue 42 is hit. In response to this, the hardware prefetch controller 40 determines to perform a descending order stream access, and thereafter, starts hardware prefetches in a descending order direction. Moreover, the hardware prefetch controller 40 updates the entry in the prefetch queue 42 from the line information indicating the cache line "A−1" to line information indicating a cache line "A−2".

The hardware prefetch controller 40 issues a hardware prefetch request to the cache memory 80, for example, every time the stream access proceeds by one cache line, and writes prefetch data into the cache memory 80. Hereinafter, an explanation is made by regarding one cache line as 128 bytes. Further, the line size is not limited to 128 bytes. For example, data of 128 bytes (one line) is transferred from the main memory 100 to the cache memory 80 at one prefetch.

Further, a prefetch target address is calculated, for example, by adding or subtracting an offset of a predetermined line (of two lines in an example of FIG. 2) to and from an address (cache line number having been hit in the prefetch queue 42) designated by a load command or the like.

For example, if target data of a prefetch is determined as targeted for the ascending order stream access, the offset addition unit 44 adds an offset of 256 bytes (two lines) to the address designated by a load command or the like to calculate a prefetch target address. Moreover, for example, if target data of a prefetch is determined as targeted for the descending order stream access, the offset addition unit 44 subtracts an offset of 256 bytes (two lines) from the address designated by a load command or the like to calculate a prefetch target address.

In the example of FIG. 2, a cache miss occurs in the cache line "A+1" at the ascending order stream access, so that the offset addition unit 44 adds 2 to the cache line "A+1" indicated by the line information registered in the prefetch queue 42. This calculates a cache line "A+3" corresponding to the prefetch target address.

For example, the offset addition unit 44 issues a hardware prefetch request of requesting execution of a hardware prefetch with respect to a prefetch target address, to the cache memory 80. In response to this, prefetch data of one line is transferred from the main memory 100 to the cache line "A+3" in the cache memory 80. Moreover, the offset addition unit 44 outputs information indicating a cache line corresponding to the prefetch target address to a comparison unit 52 in the controller 50.

In this manner, the hardware prefetch controller 40 transfers prefetch data of one line from main memory 100 to the cache line "A+3" in the cache memory 80. Moreover, the hardware prefetch controller 40 updates the entry in the prefetch queue 42 from the line information indicating the cache line "A+1" to line information indicating a cache line "A+2".

In this manner, the hardware prefetch controller 40 includes the prefetch queue 42 which stores therein line information to which the hardware prefetch controller 40 refers in order to detect a predetermined trigger, and calculates an access destination of the prefetch based on the line information stored in the prefetch queue 42. Further, the access destination and the size of the prefetch data are not limited to those in the example. For example, the access destination and the size of the prefetch data may preferably be set in a rewritable register, and be arbitrarily changed.

The fetch port 30 stores therein a command code indicating the type of command, address information (address in FIG. 2) indicating an access destination of command, and a flag. For example, command codes "01", "10", and "11" described in the column of the command code in FIG. 2 respectively indicate a load command, a store command, and a prefetch command. Further, the fetch port 30 may preferably store therein, for example, a prefetch command for loading and a prefetch command for storing in a distinguishable manner. Moreover, pieces of address information "B", "C", "D", and "A+3" described in the column of the address in FIG. 2 respectively indicate cache lines to be accessed in response to the load command or the like.

The flag indicates whether a command registered in the fetch port 30 is valid or invalid. For example, a command with a flag set to "0" is an invalid command, and is not executed. For example, the arithmetic processing device 10 selects, out of the commands registered in the fetch port 30, a command at a position designated by a pointer for reading out (hereinafter, also referred to as a read-out pointer), and accesses data in accordance with the selected command. For example, every time a command at a position designated by the read-out pointer is executed, a value of the read-out pointer is updated. In this process, a command with a flag set to "0" is skipped.

The read-out pointer is updated concurrently with access processing of the data, and thus is updated to a value indicating a next target (command) without consuming a meaningless cycle such as the NOP. Moreover, for example, at the position where the command with the access processing having been executed is registered and at the position where the command having been skipped because of the flag set to "0" is registered, a command involving memory access is newly registered. The position where the command involving memory access is newly registered is designated, for example, by a pointer for writing-in (hereinafter, also referred to as a write-in pointer). In this manner, in the fetch port 30, the registered command with the flag set to "0" is removed.

When a prefetch by the hardware prefetch controller 40 is executed, the controller 50 determines whether an unnecessary prefetch command is registered in the fetch port 30. For example, the controller 50 determines whether a prefetch command to access an access destination which is calculated based on the line information in the prefetch queue 42 is registered in the fetch port 30 based on the command code and the address information which are stored in the fetch port 30.

Further, if a prefetch command to access an access destination which is calculated based on the line information is registered in the fetch port 30, the controller 50 disables the prefetch command to access the access destination which is calculated based on the line information. In other words, the controller 50 disables the prefetch command to access the access destination which is calculated based on the line information in the prefetch queue 42 as an unnecessary prefetch command.

For example, the controller 50 includes comparison units 52, 54, and 56, and a register 58. The comparison units 52, 54, and 56 are provided, for example, so as to correspond to the respective entries (the respective entries to which hardware prefetches are concurrently executable) in the prefetch queue 42. Further, for easy understanding of the drawing, the comparison units 52, 54, and 56 each corresponding to one of the multiple entries in the prefetch queue 42 are illustrated in FIG. 2. A command code "11" indicating a prefetch command as an invalidation target, for example, is set in the register 58. The setting of the command code ("11" in FIG. 2) to the register 58 may preferably be executed once, for example, at execution of the compile processing or at run-time.

The comparison processes by the comparison units 52, 54, and 56 are executed in the order that the read-out pointer selects the commands registered in the fetch port 30, for example. For example, when a current read-out pointer indicates the lowermost row in the fetch port 30 of FIG. 2, firstly, a command code and an address at the lowermost row in the fetch port 30 are selected as comparison targets, and the comparison results are reflected in a flag at the lowermost row in the fetch port 30.

For example, the comparison unit 52 receives information indicating a cache line corresponding to the prefetch target address from the offset addition unit 44. Further, the comparison unit 52 compares, out of the commands registered in the fetch port 30, an address indicating an access destination of the command selected by the read-out pointer with the information indicating the cache line corresponding to the prefetch target address, and outputs a comparison result to the comparison unit 56.

In the example of FIG. 2, both of the address indicating the access destination of the command selected by the read-out pointer and the information indicating the cache line corresponding to the prefetch target address indicate "A+3". Accordingly, the comparison unit 52 outputs a comparison result indicating that the address indicating the access destination of the command selected by the read-out pointer agrees with the information indicating the cache line corresponding to the prefetch target address to the comparison unit 56. For example, the comparison unit 52 outputs information indicating that the comparison result is true to the comparison unit 56.

Moreover, for example, the comparison unit 54 compares, out of the commands registered in the fetch port 30, a command code of the command selected by the read-out pointer with a command code set in the register 58, and outputs a comparison result to the comparison unit 56. In the example of FIG. 2, both of the command code of the command selected by the read-out pointer and the command code set in the register 58 indicate "11". Accordingly, the comparison unit 54 outputs a comparison result indicating that the command code of the command selected by the read-out pointer agrees with the command code set in the register 58 to the comparison unit 56. For example, the comparison unit 54 outputs information indicating that the comparison result is true to the comparison unit 56.

The comparison unit 56 compares the comparison result by the comparison unit 52 with the comparison result by the comparison unit 54. If both of the comparison results are true, the comparison unit 56 sets a flag of the command selected by the read-out pointer, out of the commands registered in the fetch port 30, to "0". Further, if either one of the comparison result by the comparison unit 52 and the comparison result by the comparison unit 54 is false, the comparison unit 56 does not change the value of the flag. With this, the comparison processing (comparison processes by the comparison units 52, 54, and 56) on the command at the position indicated by the current read-out pointer is ended.

In the example of FIG. 2, the comparison unit 56 compares the comparison result by the comparison unit 52 with the comparison result by the comparison unit 54, and sets the flag of the command selected by the read-out pointer (flag at the lowermost row in the fetch port 30 in FIG. 2) to "0" because both of the comparison results are true. This makes invalid the prefetch command at the lowermost row in the fetch port 30 in FIG. 2.

Moreover, for example, when a position that the read-out pointer indicates next is the second lowermost row in the fetch port 30 in FIG. 2, the comparison processing (comparison processes by the comparison units 52, 54, and 56) is executed on a command at the second lowermost row in the fetch port 30 in FIG. 2. For example, the comparison unit 52 outputs a comparison result indicating that an address "D" indicating an access destination of the command at the second lowermost row in the fetch port 30 in FIG. 2 does not agree with the cache line "A+3" corresponding to the prefetch target address, to the comparison unit 56. For example, the comparison unit 52 outputs information indicating that the comparison result is false to the comparison unit 56.

Moreover, for example, the comparison unit 54 outputs a comparison result indicating that a command code "10" of the command at the second lowermost row in the fetch port 30 in FIG. 2 does not agree with the command code "11" set in the register 58, to the comparison unit 56. For example, the comparison unit 54 outputs information indicating that the comparison result is false to the comparison unit 56. The comparison unit 56 maintains a value of a flag of the command at the second lowermost row in the fetch port 30 in FIG. 2 to "1" because the comparison result by the comparison unit 52 and the comparison result by the comparison unit 54 are false.

In this manner, a series of the comparison processes by the comparison units 52, 54, and 56 are executed in a predetermined order for every command registered in the fetch port 30. Further, the predetermined order is not limited to the order selected by the read-out pointer. Moreover, the series of the comparison processes by the comparison units 52, 54, and 56 may preferably be executed on all the commands registered in the fetch port 30, or may preferably be executed on the commands of up to the upper limit number thereof set in advance, out of the commands registered in the fetch port 30. For example, the number of commands capable of being processed during a period of from when a hardware prefetch request is issued to when a next hardware prefetch request is issued (the number of comparison target commands) may preferably be set as the upper limit number.

Moreover, the controller 50 in FIG. 2 may implement a determination as to whether an unnecessary prefetch command is registered in the fetch port 30 through the comparison processes by the comparison units 52, 54, and 56. Accordingly, the embodiment may suppress increase in the scale of the circuit of the arithmetic processing device 10, compared with a configuration of using a complicated determination algorithm for detecting an unnecessary prefetch command.

Note that, the configurations of the fetch port 30, the hardware prefetch controller 40, and the controller 50 are not limited to those in the example. For example, the fetch port 30 may preferably store therein a logic address (for example, an address of the main memory 100) of data which is accessed in response to a load command or the like as address information. In this case, the controller 50 includes a conversion circuit which calculates a cache line corresponding to the logic address. The comparison unit 52 compares a line number of the cache line calculated in the conversion circuit with a line number indicated by the information received from the offset addition unit 44.

For example, when the line number of a cache line in the cache memory 80 is set as CL, the line size thereof as LS (bytes), the capacity thereof for one way as WS (kilobytes), and the logic address thereof as addr, the line number CL is expressed by an equation (1). Further, the logic address addr is, for example, an address of the main memory 100.

$$CL = \mathrm{mod}(addr/LS, (WS \times 1024)/LS) \qquad (1)$$

The mod in the equation (1) represents a remainder operator. In other words, the line number CL of the cache line corresponds to a remainder by dividing "addr/LS" by "(WS×1024)/LS".

Moreover, for example, the flag may preferably be omitted from the information stored in the fetch port 30. In this case, the comparison unit 56 rewrites a command code of an unnecessary prefetch command to a command code indicating a NOP command to disable the unnecessary prefetch command. Moreover, the register 58 may preferably be omitted in a case where a command code indicating a prefetch command as an invalidation target is not changed, for example. In this case, the command code "11" indicating a prefetch command as an invalidation target is set, for example, in the arithmetic processing device 10, as a fixed value.

Moreover, for example, the arithmetic processing device 10 may preferably include the fetch port 30, as divided fetch ports of a prefetch command dedicated fetch port and a fetch port for commands other than the prefetch command (load command, store command, and the like). In this case, the comparison unit 54 may preferably be omitted.

Figure 3:
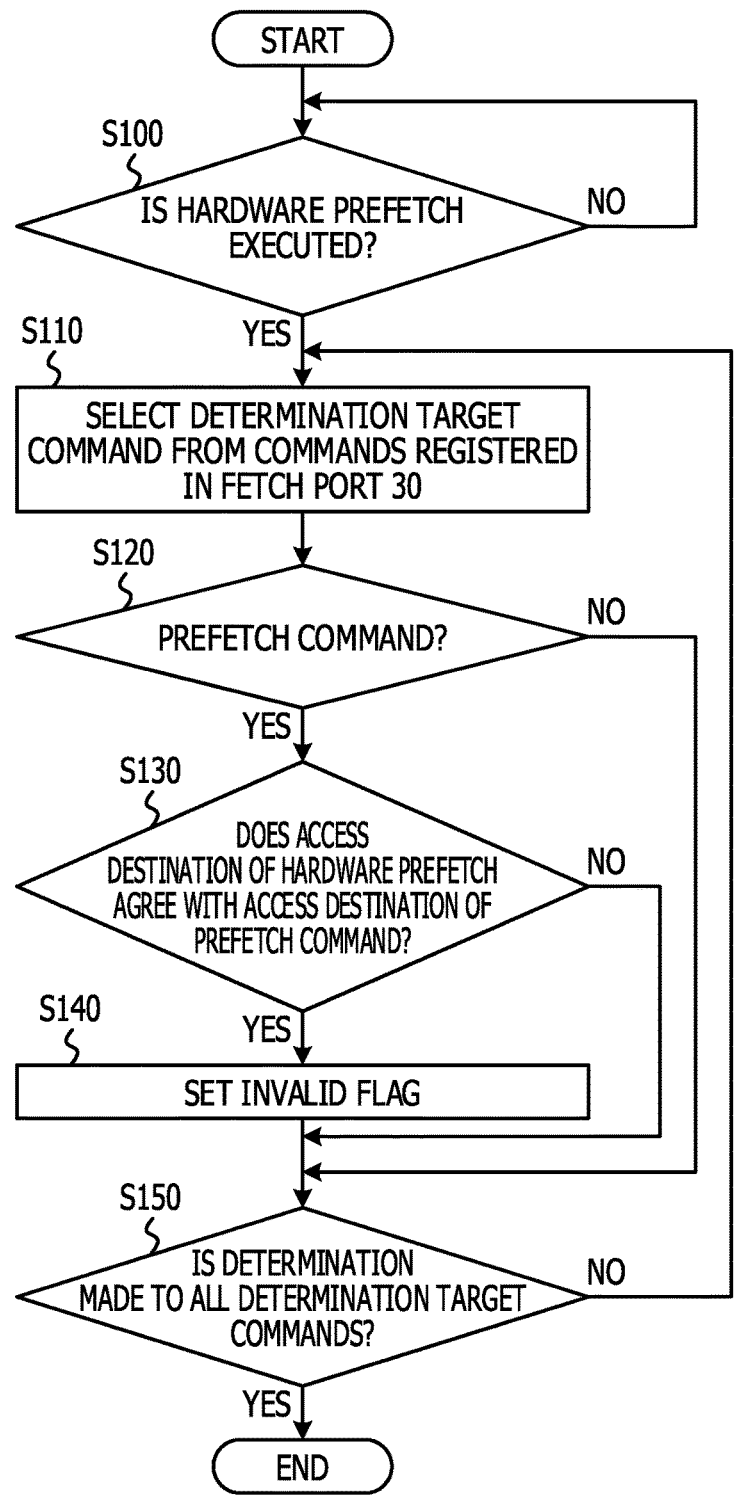
FIG. 3 illustrates an example of an operation of the arithmetic processing device illustrated in FIG. 1.

FIG. 3 illustrates an example of an operation of the arithmetic processing device 10 illustrated in FIG. 1. Further, FIG. 3 illustrates one form of a control method of the arithmetic processing device 10. The operation in FIG. 3 corresponds to an operation of the arithmetic processing device 10 when an unnecessary prefetch command is disabled. Further, decode of a command, registration of a command involving a memory access in the fetch port 30, a computation based on the command, and the like are executed concurrently with the operation in FIG. 3, for example. The operation in FIG. 3 may preferably be implemented by hardware only, or may preferably be implemented by hardware under the control of software.

At Step S100, the arithmetic processing device 10 determines whether a hardware prefetch is executed. If the hardware prefetch is executed (Yes at Step S100), the operation of the arithmetic processing device 10 proceeds to Step S110. On the other hand, if the hardware prefetch is not executed (No at Step S100), the operation of the arithmetic processing device 10 is returned to Step S100. In other words, the processes from Step S110 to Step S150 are executed every time a hardware prefetch is executed.

At Step S110, the controller 50 selects, out of the commands registered in the fetch port 30, a determination target command. For example, the controller 50 selects, out of determination target commands on which a determination as to whether being an unnecessary prefetch command is not executed, a command having the earliest order of execution of the command.

At Step S120, the controller 50 determines whether the command selected at Step S110 is a prefetch command. For example, the comparison unit 54 compares a command code of the command selected at Step S110 with a command code set in the register 58. If the command selected at Step S110 is a prefetch command (Yes at Step S120), the operation of the arithmetic processing device 10 proceeds to Step S130. On the other hand, if the command selected at Step S110 is not a prefetch command (No at Step S120), the operation of the arithmetic processing device 10 proceeds to Step S150.

At Step S130, the controller 50 determines whether an access destination of the command selected at Step S110 agrees with an access destination of the hardware prefetch. For example, the comparison unit 52 compares an address indicating the access destination of the command selected at Step S110 with an address indicating by the information received from the offset addition unit 44.

If the access destination of the command selected at Step S110 agrees with the access destination of the hardware prefetch (Yes at Step S130), the operation of the arithmetic processing device 10 proceeds to Step S140. In other words, if the command selected at Step S110 is an unnecessary prefetch command, the operation of the arithmetic processing device 10 proceeds to Step S140. On the other hand, the access destination of the command selected at Step S110 does not agree with the access destination of the hardware prefetch (No at Step S130), the operation of the arithmetic processing device 10 proceeds to Step S150. In other words, if the command selected at Step S110 is not an unnecessary prefetch command, the operation of the arithmetic processing device 10 proceeds to Step S150.

At Step S140, the controller 50 sets an invalid flag to the command selected at Step S110. For example, the comparison unit 54 sets, out of the commands registered in the fetch port 30, the flag of the command selected at Step S110 to "0".

At Step S150, the controller 50 determines whether a determination as to whether being an unnecessary prefetch command is executed on all the determination target commands. Further, the determination target commands may preferably be all the commands registered in the fetch port 30 or the commands of up to the upper limit number thereof set in advance.

If a determination target command on which a determination as to whether being an unnecessary prefetch command is not executed is present in the fetch port 30 (No at Step S150), the operation of the arithmetic processing device 10 is returned to Step S110. On the other hand, no determination target command on which a determination as to whether being an unnecessary prefetch command is not executed is present in the fetch port 30 (Yes at Step S150), the processing to disable the unnecessary prefetch command is ended. In other words, a determination as to whether being an unnecessary prefetch command is executed on all the commands as determination targets, the processing to disable the unnecessary prefetch command is ended.

In this manner, the controller 50 determines whether an unnecessary prefetch command to transfer data included in data to be transferred to the cache memory 80 by the hardware prefetch from the main memory 100 to the cache memory 80 is registered in the fetch port 30. Further, if an unnecessary prefetch command is registered in the fetch port 30, the controller 50 disables the unnecessary prefetch command. This allows the arithmetic processing device 10 to reduce memory accesses in response to the unnecessary prefetch commands.

Further, the operation of the arithmetic processing device 10 is not limited to this example. For example, the process at Step S120 may preferably be executed after the process at Step S130.

Figure 4:
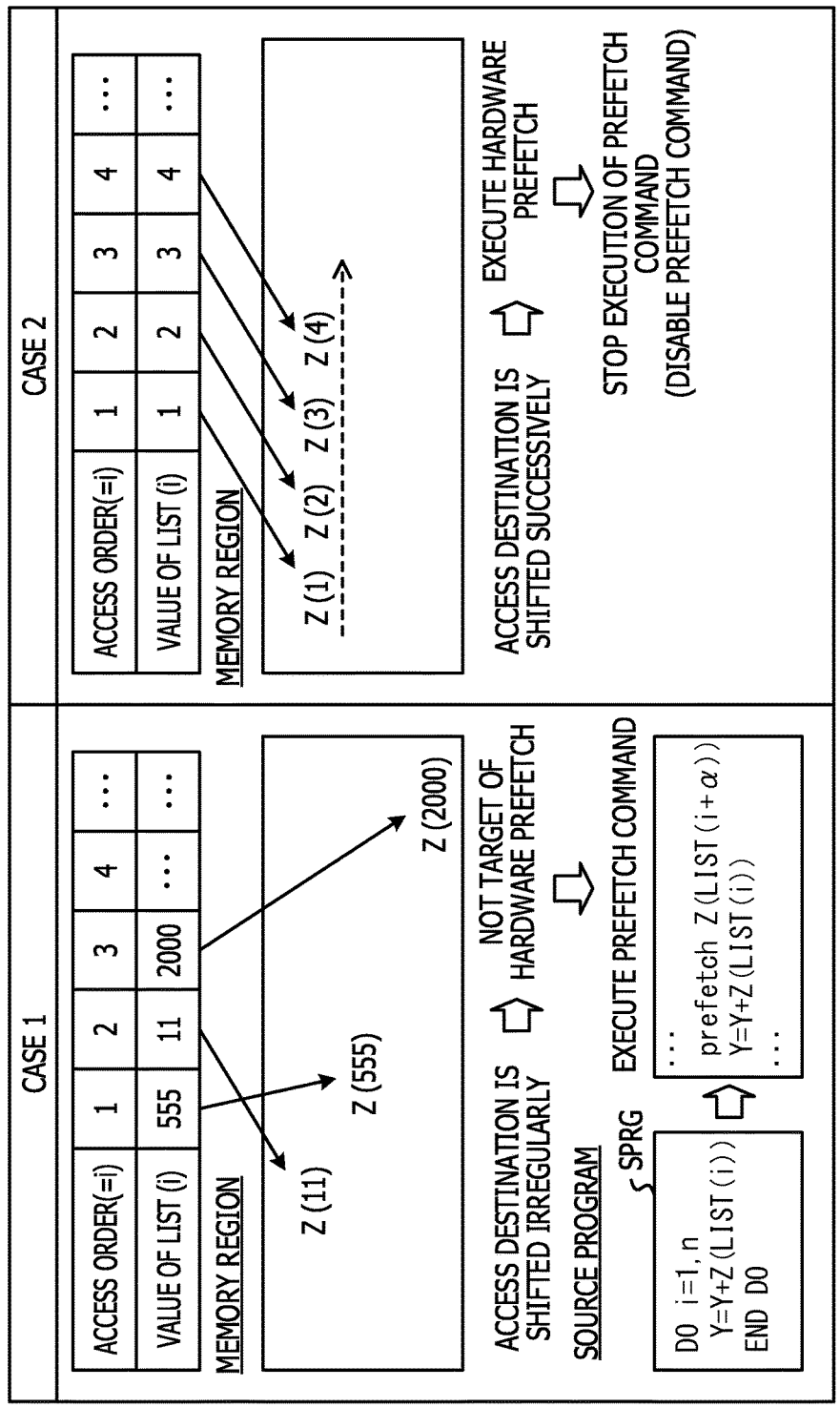
FIG. 4 illustrates an example of a relation between an access order of array data and a prefetch.

FIG. 4 illustrates an example of a relation between an access order of array data Z (LIST (i)) and a prefetch. In a source program SPRG illustrated in FIG. 4, for example, a computation of adding a value indicated by the array data Z (LIST (i)) to Y is repeated for n times. Hereinafter, the array data Z (LIST (i)) is also referred to as array data Z. For example, an access destination of the array data Z is designated by an array data LIST (i), and is fixed when the arithmetic processing device 10 executes the source program SPRG. In the example of FIG. 4, the array data Z is data of an insertion target of a prefetch command.

For example, the data of an insertion target of a prefetch command is designated by an optimization control line which gives a direction to a compiler, a pragma, or the like. The optimization control line is used, for example, in FORTRAN. Moreover, for example, the pragma is used in the C language or the like. For example, a user may preferably describe an optimization control line (for example, "!ocl prefetch_beaten (LIST (i+α))") which designates the array data Z (LIST (i)) as data of an insertion target of a prefetch command, in the source program SPRG.

In this case, a prefetch command (for example, a prefetch Z (LIST (i+α) in FIG. 4) with respect to the array data Z (LIST (i)) is created.

Further, insertion of a prefetch command may preferably be designated by, for example, a translation option. In this case, compile processing is executed on data of which access destination is fixed when the arithmetic processing device 10 executes the source program SPRG (hereinafter, also referred to as irregular indirect access data) as data of an insertion target of a prefetch command.

A reference numeral i in FIG. 4 corresponds to an access order of the array data Z. A value of the array data LIST (i) in FIG. 4 corresponds to an access destination of the array data Z (an address of the memory region).

In a case 1, values of array data LIST (1), array data LIST (2), and array data LIST (3) are respectively 555, 11, and 2000. Accordingly, the array data Z (555), the array data Z (11), and the array data Z (2000) are accessed in this order. In this manner, the access destination of the array data Z is irregularly shifted to addresses 555, 11, and 2000 in this order in the memory region.

Accordingly, a hardware prefetch to the array data Z is not executed. Meanwhile, a software prefetch to the array data Z is executed. Accordingly, a prefetch command to the array data Z is inserted. In FIG. 4, "prefetch Z (LIST (i+α))" indicates that a prefetch is executed on array data Z forward by an α element. This causes a prefetch to be executed also on irregular indirect access data. As a result, the embodiment may shorten a waiting time when data is referred.

Meanwhile, in a case 2, values of array data LIST (1), array data LIST (2), array data LIST (3), and array data LIST (4) are respectively 1, 2, 3, and 4. Accordingly, the array data Z (1), the array data Z (2), the array data Z (3), and the array data Z (4) are accessed in this order. In this manner, an access destination of the array data Z is shifted successively in the order of addresses 1, 2, 3, and 4 in the memory region.

Accordingly, a hardware prefetch to the array data Z is executed. Accordingly, the embodiment may shorten a waiting time when data is referred. Further, a hardware prefetch to the array data Z is executed, so that as explained in from FIG. 1 to FIG. 3, a prefetch command (prefetch command inserted by a software prefetch) to the array data Z is not executed. In other words, in the embodiment, it is possible to inhibit both of the hardware prefetch and the software prefetch from being executed on target data of the prefetch command.

For example, the arithmetic processing device 10 inhibits the prefetch command from being executed on the array data Z on which the hardware prefetch has been executed. In the embodiment, this may inhibit an unnecessary prefetch command from being executed. As a result, in the embodiment, it is possible to reduce decrease in performance (for example, a lowered transfer speed due to increase in the number of commands and increase in the transfer amount of a bus) of the arithmetic processing device 10 by the execution of an unnecessary prefetch command.

In the foregoing, the arithmetic processing device 10 and the control method of the arithmetic processing device 10 in the embodiment illustrated in FIG. 1 to FIG. 4 determine whether an unnecessary prefetch command is registered in the fetch port 30. Further, for example, if an unnecessary prefetch command is registered in the fetch port 30, the arithmetic processing device 10 disables the unnecessary prefetch command. The unnecessary prefetch command is, for example, a prefetch command to transfer data which is included in data transferred by the hardware prefetch controller 40 to the cache memory 80, from the main memory 100 to the cache memory 80.

In this manner, with the embodiment, it is possible to disable an unnecessary prefetch command, and accordingly to inhibit the unnecessary prefetch command from being executed. As a result, with the embodiment, it is possible to reduce memory accesses in response to the unnecessary prefetch commands. With this, in the embodiment, it is possible to reduce decrease in performance of the arithmetic processing device 10 by the execution of the unnecessary prefetch command.

The features and advantageous of the present disclosure become apparent with the detailed description in the foregoing. This intends to make claims cover the features and the advantages of the embodiment as mentioned above without departing from the spirit and scope of the present disclosure. Moreover, those skilled in the art could easily conceive of numerous modifications and changes. Therefore, the present disclosure is not intended to limit the scope of the embodiment having the inventiveness to the above description, but can be based on appropriate improvements and equivalents which are included in the scope disclosed in the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
   a decoder which decodes commands and outputs the decoded commands;
   a command holding circuit configured to receive the outputted decoded commands and register therein a first command among the received decoded commands, the first command involving memory accesses and being executed as a software prefetch;
   a hardware prefetch controller configured to execute a hardware prefetch in response to a trigger different from the first command, the hardware prefetch being an operation of transferring data stored in a memory to a cache memory; and
   a controller configured to determine whether the first command registered in the command holding circuit is an unnecessary prefetch command in accordance with the hardware prefetch, and disable the determined unnecessary prefetch command.

2. The arithmetic processing device according to claim 1, wherein
   the controller is configured to disable the unnecessary prefetch command by deleting the unnecessary prefetch command from the command holding circuit.

3. The arithmetic processing device according to claim 1, wherein
   the hardware prefetch controller includes an address holding circuit configured to store therein first address information to which the hardware prefetch controller refers in order to detect the trigger different from the first command, and calculate an access destination of the prefetch based on the first address information stored in the address holding circuit,
   the command holding circuit is configured to store therein a command code indicating a type of the first command, and second address information indicating an access destination of the first command, and
   when the hardware prefetch controller executes the hardware prefetch, the controller determines whether the unnecessary prefetch command to access the access destination calculated based on the first address information is registered in the command holding circuit based on the command codes and the second address information which are stored in the command holding circuit, and disables the unnecessary prefetch command when the unnecessary prefetch command is registered in the command holding circuit.

4. A control method of an arithmetic processing device, comprising:
   decoding commands by a decoder in the arithmetic processing device;
   outputting the decoded commands by the decoder;
   receiving, in a command holding circuit, the outputted decoded commands;
   registering, in the command holding circuit, a first command among the received decoded commands, the first command involving memory accesses and being executed as a software prefetch;
   in response to a trigger different from the first command, executing the hardware prefetch by a hardware prefetch controller in the arithmetic processing device, the hardware prefetch being an operation of transferring data stored in a memory to a cache memory in advance;
   determining, by a controller in the arithmetic processing device, whether the first command registered in the command holding circuit is an unnecessary prefetch command in accordance with the hardware prefetch; and
   disabling the determined unnecessary prefetch command.

5. The control method according to claim 4, wherein
   the disabling of the unnecessary prefetch command by the controller is performed by deleting the unnecessary prefetch command from the command holding circuit.

6. The control method according to claim 4, further comprising:
   storing, in an address holding circuit by the hardware prefetch controller, first address information to which the hardware prefetch controller refers in order to detect the trigger different from the first command;
   calculating an access destination of the hardware prefetch by the hardware prefetch controller based on the first address information stored in the address holding circuit;
   storing, in the command holding circuit, a command code indicating a type of the first command, and second address information indicating an access destination of the first command, and
   when the hardware prefetch controller executes the hardware prefetch, determining, by the controller, whether the unnecessary prefetch command to access the access destination calculated based on the first address information is registered in the command holding circuit based on the command codes and the second address information which are stored in the command holding circuit; and disabling the unnecessary prefetch command by the controller, when the unnecessary prefetch command is registered in the command holding circuit.

* * * * *